United States Patent
Lounnas et al.

(10) Patent No.: US 10,703,310 B2
(45) Date of Patent: Jul. 7, 2020

(54) METHOD FOR MANAGING THE POWER SUPPLY OF AN ELECTRONIC CONTROL UNIT DURING THE STARTING PHASE OF A MOTOR VEHICLE

(71) Applicants: Continental Automotive France, Toulouse (FR); Continental Automotive GmbH, Hannover (DE)

(72) Inventors: Amar Lounnas, Noé (FR); Jean-Claude Prouvoyeur, Saint-Jean (FR); Christophe Pradelles, Fiac (FR)

(73) Assignees: Continental Automotive France (FR); Continental Automotive GmbH (DE)

( * ) Notice: Subject to any disclaimer, the term of this patent is extended or adjusted under 35 U.S.C. 154(b) by 0 days.

(21) Appl. No.: 15/777,968

(22) PCT Filed: Nov. 18, 2016

(86) PCT No.: PCT/EP2016/001932
§ 371 (c)(1),
(2) Date: May 22, 2018

(87) PCT Pub. No.: WO2017/088969
PCT Pub. Date: Jun. 1, 2017

(65) Prior Publication Data
US 2018/0345888 A1     Dec. 6, 2018

(30) Foreign Application Priority Data

Nov. 23, 2015   (FR) ........................ 15 61264

(51) Int. Cl.
*G06F 1/00*     (2006.01)
*B60R 16/033*     (2006.01)
(Continued)

(52) U.S. Cl.
CPC ............ *B60R 16/033* (2013.01); *B60R 16/03* (2013.01); *F02N 11/0803* (2013.01);
(Continued)

(58) Field of Classification Search
CPC .................................................. B60R 16/033
See application file for complete search history.

(56) References Cited

U.S. PATENT DOCUMENTS 3,628,042 A * 12/1971 Jacobus .................. F16H 61/46
290/40 R
6,524,217 B1 * 2/2003 Murakami ............. B60K 6/365
180/65.225

(Continued)

FOREIGN PATENT DOCUMENTS

| EP | 0444997 A1 | 9/1991 |
| JP | 2012001020 A | 1/2012 |

OTHER PUBLICATIONS

International Search Report and Written Opinion for International Application No. PCT/EP2016/001932, dated Feb. 20, 2017, 7 pages.

(Continued)

*Primary Examiner* — Mohammed H Rehman
(74) *Attorney, Agent, or Firm* — RatnerPrestia

(57) ABSTRACT

A method for managing the power supply of an electronic control unit during the engine starting phase of a motor vehicle, the electronic control unit including a microcontroller, wherein a command to start the engine indicating the start of the starting phase is detected; the frequency of operation of the microcontroller is reduced; this reduced frequency of operation of the microcontroller is maintained for as long as effective starting of the engine has not been acknowledged; and the frequency of operation of the micro- (Continued)

controller is re-established once effective starting of the engine has been acknowledged.

14 Claims, 2 Drawing Sheets

(51) Int. Cl.
    *B60R 16/03*     (2006.01)
    *F02N 11/08*     (2006.01)
    *G06F 1/324*     (2019.01)
    *G06F 1/3234*     (2019.01)
    *H04L 12/40*     (2006.01)

(52) U.S. Cl.
    CPC .......... *F02N 11/0866* (2013.01); *G06F 1/324* (2013.01); *G06F 1/3243* (2013.01); *H04L 12/40* (2013.01); *F02N 2250/02* (2013.01); *F02N 2300/304* (2013.01); *H04L 2012/40215* (2013.01); *H04L 2012/40273* (2013.01)

(56) References Cited

U.S. PATENT DOCUMENTS

| | | | | |
|---|---|---|---|---|
| 7,069,347 | B1* | 6/2006 | Kolokowsky | G06F 1/266 710/10 |
| 2004/0130283 | A1* | 7/2004 | Kuribayashi | H02P 9/30 318/434 |
| 2007/0175429 | A1* | 8/2007 | Yanagida | F02N 11/04 123/179.14 |
| 2007/0257771 | A1* | 11/2007 | Moser | B60R 25/24 340/5.61 |
| 2013/0294929 | A1* | 11/2013 | Gourves | F04B 49/022 417/12 |
| 2014/0132334 | A1* | 5/2014 | Park | G11C 5/14 327/513 |
| 2014/0211575 | A1* | 7/2014 | Yang | G11C 5/145 365/189.11 |
| 2014/0269227 | A1* | 9/2014 | Bobev | G04G 3/04 368/159 |
| 2015/0307083 | A1* | 10/2015 | Hisano | B60W 50/085 701/22 |
| 2015/0346321 | A1* | 12/2015 | Jansen | G01S 7/02 342/107 |
| 2016/0001761 | A1* | 1/2016 | Kawai | B60L 3/0061 701/22 |
| 2016/0217633 | A1* | 7/2016 | Jang | G06K 19/07309 |
| 2016/0221536 | A1* | 8/2016 | Petel | B60R 25/246 |
| 2016/0283432 | A1* | 9/2016 | Marinho | G06F 13/4282 |

OTHER PUBLICATIONS

English Translation of the Written Opinion for International Application No. PCT/EP2016/001932, dated Feb. 20, 2017, 5 pages.

\* cited by examiner

METHOD FOR MANAGING THE POWER SUPPLY OF AN ELECTRONIC CONTROL UNIT DURING THE STARTING PHASE OF A MOTOR VEHICLE

CROSS REFERENCE TO RELATED APPLICATIONS

This application is the U.S. National Phase Application of PCT International Application No. PCT/EP2016/001932, filed Nov. 18, 2016, which claims priority to French Patent Application No. 1561264, filed Nov. 23, 2015, the contents of such applications being incorporated by reference herein.

FIELD OF THE INVENTION

The present invention relates to a method for managing the power supply of an electronic control unit during the starting phase of a motor vehicle.

BACKGROUND OF THE INVENTION

Conventionally, a motor vehicle comprises an electronic control unit (also called BCM or Body Control Module) for controlling a certain number of items of equipment in the vehicle. Among this equipment mention may be made, for example, of the electrical control system for the windows of the vehicle, the electrical control system for the rear view mirrors, the air conditioning system, the vehicle immobilization system, the central locking system, etc. Such an electronic control unit generally comprises a microcontroller, a voltage regulator, a clock, inputs, outputs, a memory, etc. This electronic control unit is powered by the vehicle battery. The higher the operating frequency of the electronic control unit, the higher the power consumption.

The electronic control unit has two configuration modes:
- a low-power mode during which the electronic control unit is on standby and has the main function of examining the periodically powered sources for awakening said electronic control unit from sleep mode;
- a high-power mode, triggered immediately following detection of a source of awakening from sleep mode, such as, for example, a command to start the vehicle engine, and during which all the inputs of the electronic control unit are continuously powered, said electronic control unit thus being switched into a high-frequency operating mode via a phase locked loop.

This variation in voltage has the following profile (illustrated in solid line in FIG. 1):
- a first phase $t_1$ referred to as the "initialize-start phase" corresponding to the switching-on of the vehicle engine starter. Because the starter draws a great deal of current, a significant drop in battery voltage is recorded during this phase, this voltage dropping from a nominal value $U_B$, of the order of 13.5 Volts, to a value $U_S$ of the order of 4.5 Volts;
- an intermediate phase $t_2$ referred to as the "on-starter phase" during which the battery voltage increases again and fluctuates around a value $U_D$, these fluctuations corresponding to the action of the starter;
- a last phase $t_3$ referred to as the "exit-start phase" when the engine is turning over. A voltage rise is recorded during this phase, until the voltage returns to the nominal battery voltage value $U_B$.

When the battery is aging, or alternatively in cold weather with very low temperatures, there is a risk, during the voltage drop of the first phase t1, that the battery voltage will drop below an electronic control unit reset threshold $U_{SR}$ and notably potentially lead to a loss of operation of said electronic control unit. This reset threshold $U_{SR}$ varies between 3.5 and 4.5 Volts, depending on the characteristics of the electronic products.

It is known practice, in order to overcome this problem of resetting the electronic control unit, to use one or more capacitors, also referred to as "tank capacitors", mounted in parallel, upstream of the voltage regulator, and making it possible to slow the drop in voltage of the first phase $t_1$, preventing said voltage UC at the inlet of the electronic control unit from dropping below the reset threshold $U_{SR}$ (as illustrated in dotted line in FIG. 1) and, therefore, ensuring that said electronic control unit maintains its functions. Thus, these tank capacitors, which are permanently charged, act as a buffer in case the battery should fail. The capacitance of these tank capacitors varies so as to ensure that the voltage at the output of the voltage regulator is above the reset threshold $U_{SR}$, and therefore depends on the consumption of the electronic control unit. Thus, the higher the consumption of the electronic control unit, the higher the capacitance of the tank capacitors. However, the higher the capacitance of the tank capacitors, the greater their size, which means that they occupy more space on the printed circuit of the electronic control unit, increasing the overall size thereof. In addition, these electronic components have an inevitable cost which it is appropriate to reduce.

It is also known and recommended practice to deactivate certain functions that are not essential to the starting phase such as, for example, the radiofrequency reception function, the functions responsible for authenticating the key providing access to the vehicle, for extinguishing lighting devices, wipers, etc., and to maintain, during the phase of starting the engine, only the essential functions, such as the communications on the CAN (Controller Area Network) bus, when the vehicle is equipped with such a data bus.

However, the current trend is toward providing vehicles that include ever increasing numbers of on-board functions, and this inevitably leads to an increase in the power consumption right from the phase of starting of the vehicle engine.

SUMMARY OF THE INVENTION

An aspect of the present invention proposes a starting mode that is free of the aforementioned disadvantages.

According to an aspect of the invention, this object is achieved by virtue of a method for managing the power supply of an electronic control unit during the engine starting phase of a motor vehicle, said electronic control unit comprising a microcontroller, notable in that:
- a command to start the engine indicating the start of the engine starting phase is detected;
- the frequency of operation of the microcontroller is reduced;
- this reduced frequency of operation of the microcontroller is maintained for as long as effective starting of the engine has not been acknowledged;
- the frequency of operation of the microcontroller is re-established once effective starting of the engine has been acknowledged.

The method according to an aspect of the invention affords several beneficial advantages. In particular:
- a reduction in power consumption during the vehicle engine starting phase;

a reduction in the capacitance of the tank capacitors used to mitigate against the drop in battery voltage upon the starting of the vehicle engine;

and, therefore, a reduction in the overall size of the electronic control unit.

According to one preferred exemplary embodiment:

when the command to start the engine is detected and the frequency of operation of the microcontroller of the electronic control unit is reduced, only the inputs involved in said vehicle engine starting phase are powered, the other inputs not being powered or being inhibited;

when effective starting of the engine has been acknowledged and the frequency of operation of the microcontroller of the electronic control unit has recovered to its nominal value, all the inputs of the microcontroller are continuously powered.

In that way, when it is possible to dispense with certain functions that are not essential to the starting phase, the power saving is further improved.

According to one preferred exemplary embodiment, when the starting phase is detected and the frequency of operation of the microcontroller of the electronic control unit is reduced, the inputs involved in said vehicle engine starting phase are powered periodically.

According to one preferred exemplary embodiment, when the electronic control unit is fitted with a CAN bus, the frequency of operation of the microcontroller of the electronic control unit during the starting phase is equal to the clock frequency of said CAN bus.

According to one preferred exemplary embodiment, the frequency of operation of the microcontroller of the electronic control unit during the starting phase is of the order of 8 MHz.

According to one advantageous exemplary embodiment, the reduction in the frequency of operation of the microcontroller is achieved by means of a phase locked loop.

According to one advantageous embodiment, detection of the command to start is performed by detecting operation of the vehicle ignition or by detecting actuation of a "start" button that starts the vehicle engine or by software start control.

According to one embodiment, when the microcontroller is equipped with a CAN bus, acquisition of the information item acknowledging effective starting of the engine is performed by communication on said CAN bus.

According to another exemplary embodiment, acquisition of the information item acknowledging effective starting of the engine is performed by monitoring the battery charging voltage, by detecting a positive gradient in the variation in said voltage and the exceeding of a predefined threshold.

According to another exemplary embodiment, acquisition of the information item acknowledging effective starting of the engine is performed by monitoring the tank capacitors' charging voltage, by detecting a positive gradient in the variation in said voltage and the exceeding of a predefined threshold.

BRIEF DESCRIPTION OF THE DRAWINGS

Other objects, features and advantages of the present invention will become apparent from the following description, provided by way of non-limiting example with reference to the appended drawings, in which.

DETAILED DESCRIPTION OF THE PREFERRED EMBODIMENTS

Figure 3:
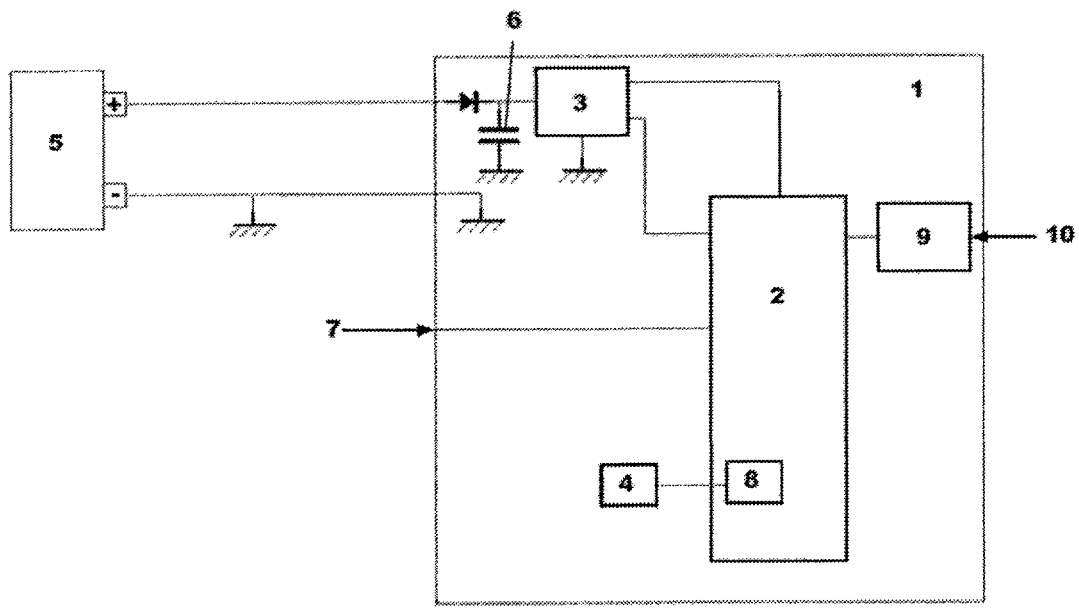
FIG. 3 is a schematic view illustrating the electronic diagram of a first exemplary embodiment of the management method according to an aspect of the invention.

As illustrated in FIG. 3, an electronic control unit 1 generally comprises:

a microcontroller 2, a voltage regulator 3, a clock 4, inputs, outputs, a memory, etc.

This electronic control unit is powered by the battery 5 of the vehicle.

Such an electronic control unit 1 also comprises, upstream of the voltage regulator 3, one or more tank capacitors 6.

According to an aspect of the invention, the method for managing the power supply of the electronic control unit 1 during the motor vehicle starting phase comprises the following steps:

detection of a command to start the engine 7, indicating the start of the initialize-start phase;

reduction of the frequency of operation of the microcontroller 2 of the electronic control unit 1;

the maintaining of this reduced frequency of operation of the microcontroller 2 of the electronic control unit 1 for as long as effective starting of the engine has not been acknowledged;

re-establishment of the normal frequency of operation of the microcontroller 2 of the electronic control unit 1 once effective starting of the engine has been acknowledged.

Figure 2:
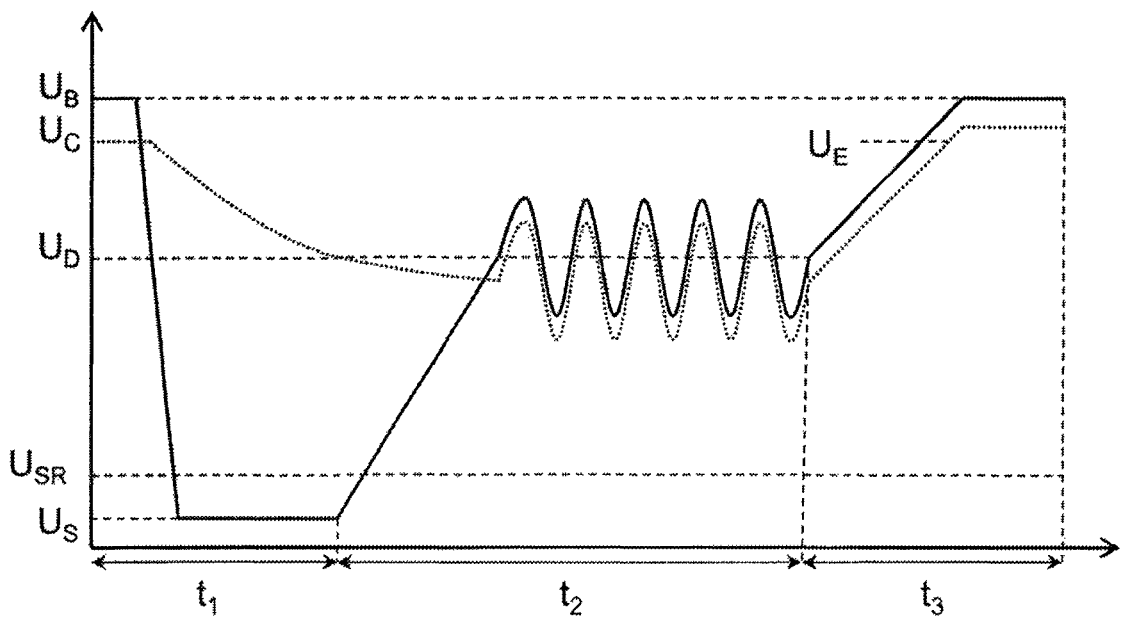
FIG. 2 is a view illustrating, in solid line, the profile of variations in battery voltage during the vehicle engine starting phase and, in dotted line, the profile of variations in the voltage at the input to the electronic control unit, obtained by applying the method according to an aspect of the invention.

The method of an aspect of the invention thus makes it possible to reduce the power consumption during the motor vehicle engine starting phase and as a result makes it possible, for the same capacitance of the tank capacitor or capacitors 6 used at present, to reduce the voltage drop across the terminals of the tank capacitor or capacitors 6 upon vehicle engine starting. In other words, the method according to an aspect of the invention makes it possible to filter the variation in voltage at the input to the electronic control unit 1 as illustrated in FIG. 2, during the vehicle engine starting phase and particularly during the initialize-start phase t1, so that this voltage remains above the reset threshold $U_{SR}$ of the electronic control unit 1.

Figure 1:
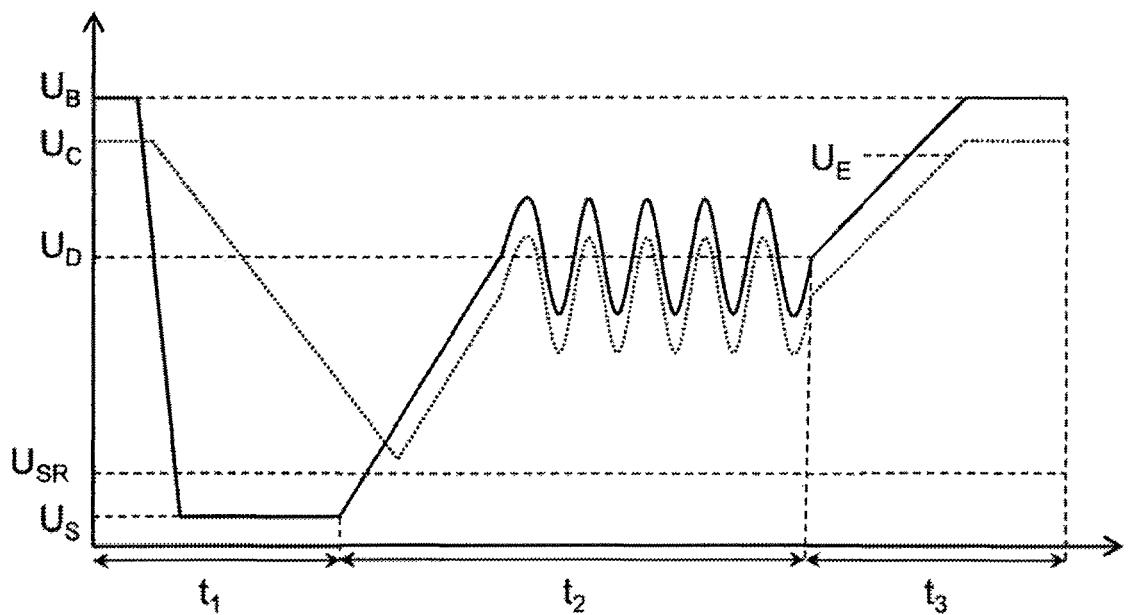
FIG. 1, as discussed earlier, is a view illustrating, in solid line, the profile of variations in battery voltage during the vehicle engine starting phase and, in dotted line, the profile of variations in the voltage at the input to the electronic control unit, according to the prior art.

Thus, the leeway regarding the capacitance of the tank capacitor or capacitors which is needed in order for the input voltage of the electronic control unit 1 to remain above the reset threshold $U_{SR}$ is improved. In that way, it is possible to obtain a profile for the voltage across the terminals of the tank capacitor or capacitors 6 upon vehicle engine starting with a voltage drop at the limit of the reset threshold $U_{SR}$ (a profile identical to that of the prior art illustrated in FIG. 1), using a lower capacitance of the tank capacitor or capacitors 6.

The detection of the command to start the engine 7 is achieved in various ways. For example, the starting phase is detected:
- when the ignition is actuated (also referred to as the "key-on" command);
- by the pressing of a "start" button of a start/stop device (usually referred to as a "start/stop" button) in order to transmit to an engine management computer, a command to start or stop this engine;
- by software control of the start, in the case of vehicles incorporating a "stop and go" (stop/restart) function, namely a function that stops the engine when the vehicle is immobile and automatically restarts as soon as the vehicle starts to move again (following, for example, pressure on the throttle pedal or on the clutch pedal).

When the command to start 7 is detected, the frequency of operation of the microcontroller of the electronic control unit is switched to a frequency below its "normal" or "nominal" operating frequency, which is generally comprised between 40 MHz and 80 MHz. This reduced frequency is of the order of 8 MHz.

This reduction in frequency is achieved, in a way known per se, by means of a phase locked loop 8 (also known as a "PLL").

When the electronic control unit 1 is fitted with a CAN bus 9, the frequency of operation of the microcontroller 2 of the electronic control unit 1 during the starting phase is reduced to a value equal to the clock frequency of said CAN bus 9. Specifically, in instances in which the electronic control unit 1 is fitted with a CAN bus 9, the communications on said CAN bus 9 are substantial and essential during said starting phase. In general, the frequency of the CAN bus 9 is of the order of 500 kHz, requiring a microcontroller clock frequency of the order of 8 MHz. Thus, according to the method of an aspect of the invention, the frequency of operation of the microcontroller 2 of the electronic control unit 1 is reduced and maintained at a value of 8 MHz for as long as effective starting of the engine has not been acknowledged.

In order to increase the power saving during the vehicle engine starting phase, only those stages which are essential during said vehicle engine starting phase, such as, for example, communications on the CAN bus 9 when the electronic control unit is equipped with such a CAN bus 9, or scrutiny of information pertaining to the stopping of the start procedure, are powered.

Those functions which, on the other hand, are not necessary during the starting phase are, in a way known per se, switched off or inhibited (which means to say that although power is applied to them, these inputs are not read by the microcontroller 2).

Figure 4:
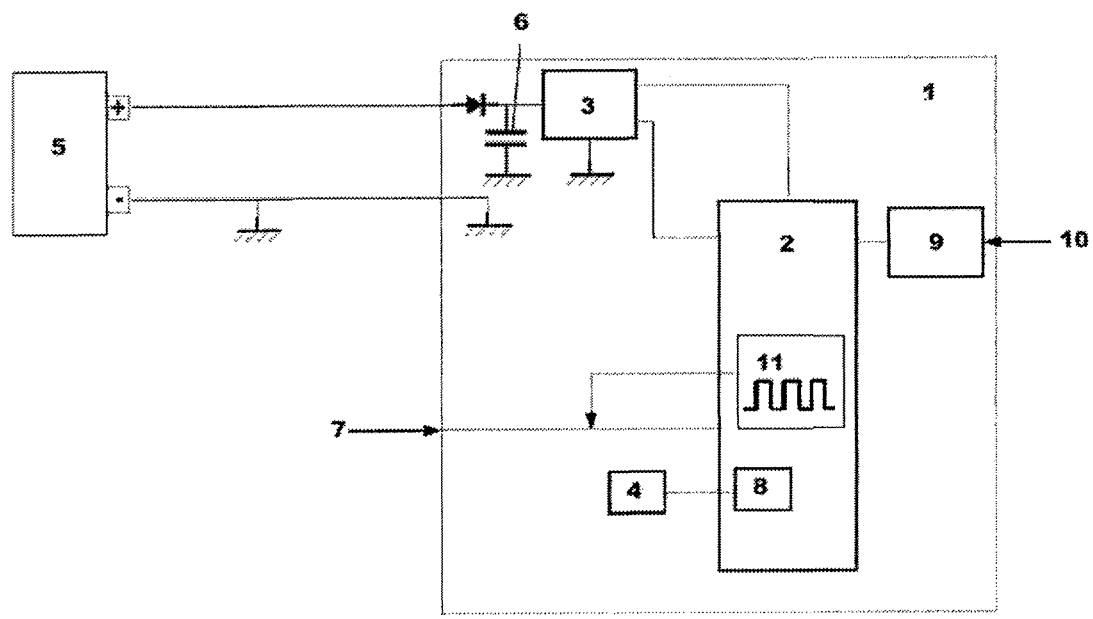
FIG. 4 is a schematic view illustrating the electronic diagram of another exemplary embodiment of the management method according to an aspect of the invention.

For preference and advantageously, as illustrated in FIG. 4, in order to further improve the power saving during the vehicle engine starting phase, those inputs which are powered during this starting phase are done so periodically. This periodic powering of the inputs during the vehicle engine starting phase is performed in a way known per se using a specific switched power supply 11.

This mode of operation during which the frequency of operation of the microcontroller 2 of the electronic control unit 1 is reduced and, possibly, when certain inputs of the microcontroller 2 are not powered or are powered periodically is maintained throughout the entire duration of the vehicle engine starting phase. In other words, this mode of operation is maintained for as long as effective starting of the vehicle has not been acknowledged.

The information item 10 acknowledging effective starting of the vehicle engine is obtained in a number of ways.

For example, when the microcontroller 2 of the electronic control unit 1 is equipped with a CAN bus 9, acquisition of the information item 10 acknowledging effective starting of the engine is performed by communication on said CAN bus 9 which itself obtains this information in a way known per se directly from an engine management computer with which the vehicle is equipped.

Advantageously, particularly when the vehicle is not equipped with a CAN bus 9, acquisition of the information item 10 acknowledging effective starting of the engine is performed by monitoring the battery 5 charging voltage. Thus, a positive gradient in the variation in said battery charging voltage, combined with the exceeding of a predefined threshold $U_E$, are the characteristic signs that the vehicle engine is turning over, or in other words of acknowledgement of effective starting of the vehicle engine.

According to another example, acquisition of the information item 10 acknowledging effective starting of the engine is performed by monitoring the tank capacitors' 6 charging voltage. As before, a positive gradient in the variation in said voltage and the exceeding of a predefined threshold $U_E$ are the characteristic signs that the vehicle engine is turning over, or in other words of acknowledgement of effective starting of the vehicle engine.

For example, the threshold $U_E$ that makes it possible to define acquisition of the information item 10 acknowledging effective starting of the engine is higher than the maximum value of the voltage fluctuations during the intermediate starting phase $t_2$ referred to as the "on-starter phase".

Finally, when effective starting of the vehicle has been acknowledged, the frequency of operation of the microcontroller of the electronic control unit is switched to its "normal" operating frequency, namely for example a frequency of the order of 40 MHz, in a way known per se, via the phase locked loop 8.

In addition, those inputs which were no longer powered or which were powered periodically are once again powered continuously.

The invention claimed is:

1. A method for managing a power supply of an electronic control unit during an engine starting phase of a motor vehicle combustion engine, said electronic control unit comprising a microcontroller, the method comprising:
   receiving a command to start the combustion engine;
   in response to receiving the command to start the combustion engine, reducing a frequency of operation of the microcontroller to a predetermined reduced clock frequency while the internal combustion engine starts a turning over process;
   maintaining this reduced clock frequency of the microcontroller for as long as the turning over process of the combustion engine is being performed and the effective starting of the combustion engine has not been acknowledged; and
   increasing the frequency of operation of the microcontroller to a predetermined clock frequency for controlling a plurality of functions of the motor vehicle once the turning over process of the combustion engine is complete and the effective starting of the combustion engine has been acknowledged.

2. The management method as claimed in claim 1, wherein:

when the command to start the combustion engine is detected and the frequency of operation of the microcontroller of the electronic control unit is reduced, only the inputs involved the starting of the combustion engine are powered, the other inputs not being powered or being inhibited; and when effective starting of the combustion engine has been acknowledged and the frequency of operation of the microcontroller of the electronic control unit has recovered to its nominal value, all the inputs of the microcontroller are continuously powered.

3. The management method as claimed in claim 2, wherein, when the frequency of operation of the microcontroller of the electronic control unit is reduced, the inputs involved in the starting of the combustion engine are powered periodically.

4. The management method as claimed in claim 3, wherein, when the electronic control unit is fitted with a CAN bus, the frequency of operation of the microcontroller of the electronic control unit during the starting of the combustion engine is equal to the clock frequency of said CAN bus.

5. The management method as claimed in claim 2, wherein, when the electronic control unit is fitted with a CAN bus, the frequency of operation of the microcontroller of the electronic control unit during the starting of the combustion engine is equal to the clock frequency of said CAN bus.

6. The management method as claimed in claim 1, wherein, when the electronic control unit is fitted with a CAN bus, the frequency of operation of the microcontroller of the electronic control unit during the starting of the combustion engine is equal to the clock frequency of said CAN bus.

7. The management method as claimed in claim 6, wherein the frequency of operation of the microcontroller of the electronic control unit during the starting of the combustion engine is of an order of 8 MHz.

8. The management method as claimed in claim 1, wherein the reduction in the frequency of operation of the microcontroller during the starting of the combustion engine is achieved by a phase locked loop.

9. The management method as claimed in claim 1, wherein receiving the command to start the combustion engine is performed by detecting operation of the vehicle ignition or by detecting actuation of a "start" button that starts the combustion engine or by software start control.

10. The management method as claimed in claim 1, wherein, when the microcontroller is equipped with a CAN bus, acquisition of an information item acknowledging effective starting of the combustion engine is performed by communication on said CAN bus.

11. The management method as claimed in claim 1, wherein acquisition of the information item acknowledging effective starting of the combustion engine is performed by monitoring a battery charging voltage, by detecting a positive gradient in a variation in said voltage and determining when said voltage exceeds a predefined threshold.

12. The management method as claimed in claim 1, wherein acquisition of the information item acknowledging effective starting of the combustion engine is performed by monitoring a charging voltage of tank capacitors, by detecting a positive gradient in the variation in said voltage and determining when said voltage exceeds a predefined threshold.

13. The management method as claimed in claim 1, further comprising:
receiving a message from an engine management computer, the message acknowledging the effective starting of the combustion engine.

14. The management method as claimed in claim 1, further comprising:
acknowledging the effective starting of the combustion engine in response to a voltage gradient of the power supply combined with a voltage of the power supply reaching a threshold.

* * * * *

UNITED STATES PATENT AND TRADEMARK OFFICE
CERTIFICATE OF CORRECTION

PATENT NO. : 10,703,310 B2  
APPLICATION NO. : 15/777968  
DATED : July 7, 2020  
INVENTOR(S) : Amar Lounnas, Jean-Claude Prouvoyeur and Christophe Pradelles It is certified that error appears in the above-identified patent and that said Letters Patent is hereby corrected as shown below:

In the Claims

In Column 6, Line 51, "engine, reduing a frequecy" should read --engine, reducing a frequency--.

In Column 7, Line 4, "the inputs involved the starting of the combustion" should read --the inputs involved in the starting of the combustion--.

Signed and Sealed this  
Eighteenth Day of August, 2020

Andrei Iancu  
*Director of the United States Patent and Trademark Office*